Figure 1:
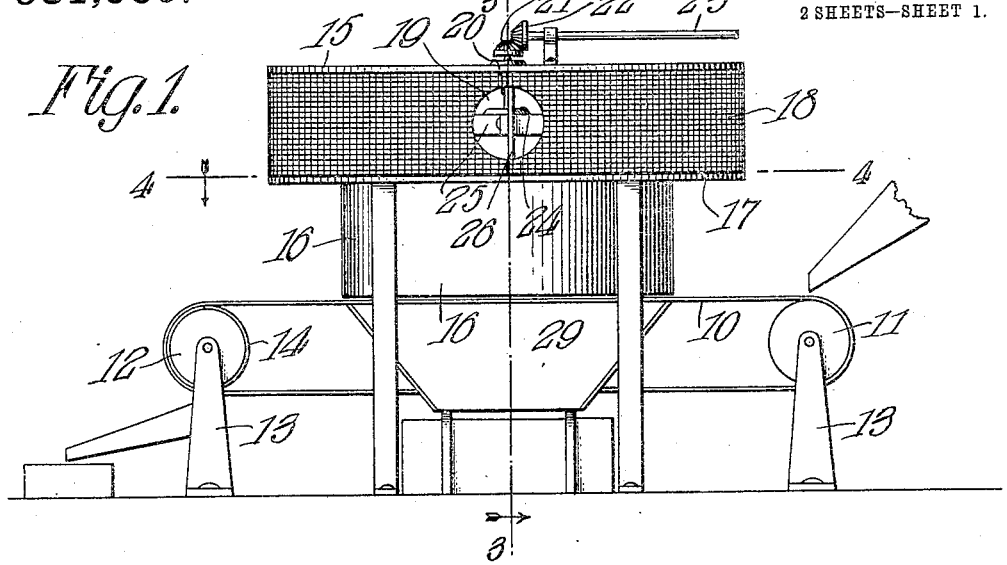

L. O. HAGE.
FANNING MILL.
APPLICATION FILED MAR. 27, 1908.

931,060.

Patented Aug. 17, 1909.
2 SHEETS—SHEET 1.

Witnesses
Chas. C. Richardson.
M. J. Miller.

Inventor
Louis O. Hage.
By Chandler & Chandler
Attorney

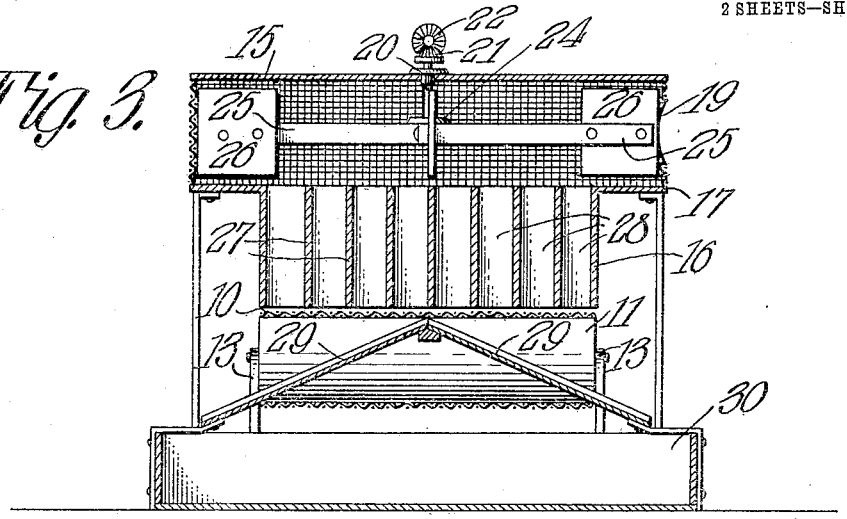
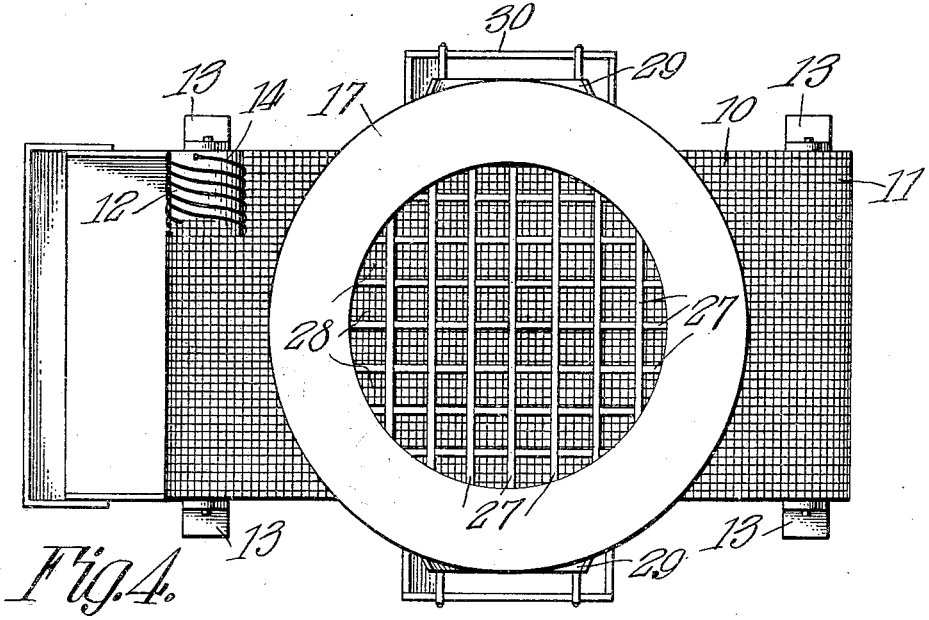

UNITED STATES PATENT OFFICE.

LOUIS O. HAGE, OF HALSTAD, MINNESOTA.

FANNING-MILL.

No. 931,060.  Specification of Letters Patent.  Patented Aug. 17, 1909.

Application filed March 27, 1908.  Serial No. 423,657.

*To all whom it may concern:*

Be it known that I, LOUIS O. HAGE, a citizen of the United States, residing at Halstad, in the county of Norman, State of Minnesota, have invented certain new and useful Improvements in Fanning-Mills; and I do hereby declare the following to be a full, clear, and exact description of the invention, such as will enable others skilled in the art to which it appertains to make and use the same.

This invention relates to fanning mills and more particularly to that class in which a foraminous conveyer travels beneath the fan of the mill, the fan acting, by suction force, to stand the grain on end as it is carried beneath the fan by the conveyer.

More specifically speaking, the mill embodying my invention is designed to separate the wild oats from cultivated oats and with knowledge of the fact that wild oats are rough whereas cultivated oats are smooth, I so construct the foraminous conveyer that when the grains are raised, by suction force exerted by the fan of the mill, to stand on their butt ends, the wild oats will be caught in the mesh of the conveyer whereas the smooth grains of cultivated oats will merely rest upon the conveyer. A conveyer is passed over two rollers one roller being smooth and the other roller provided with a circumscribing wire or other means for spacing the conveyer apron therefrom and by this peculiar construction of rollers, the cultivated oats are permitted to drop off from the conveyer apron as the apron passes over the roller whereas the wild oats are carried around by the apron until the smooth roller is reached. This latter roller being smooth, the conveyer apron rests flat thereagainst and the grains of wild oats are in this manner forced or pushed from the apron and are allowed to fall. While the suction force exerted by the fan of the mill is not sufficiently strong to draw the grains of oats from the foraminous conveyer apron, it is sufficiently strong to draw up any hulls, small bits of straw, etc., and the very small grains such as flax, timothy, etc., fall through the mesh of the apron.

One of the novel features of my invention resides in the peculiar construction of the air drum through which the air is drawn into the fan casing. Heretofore an ordinary cylindrical drum has been used, but I have found that the employment of such a drum results in the formation of vortical air currents above the apron and that the efficiency of the mill is detracted from but in carrying out my invention I form within the air drum a plurality of vertical air passages, preferably by disposing a number of intersecting plates within the drum, and the air is drawn directly vertically through these air passages, the formation of eddy currents being in this manner obviated.

Another novel feature of my invention resides in forming one of the rollers over which the conveyer apron passes in such a manner as to space the apron therefrom so that the cultivated grain is allowed to drop from the apron before the wild grain is forced from the apron by the other roller.

Figure 2:
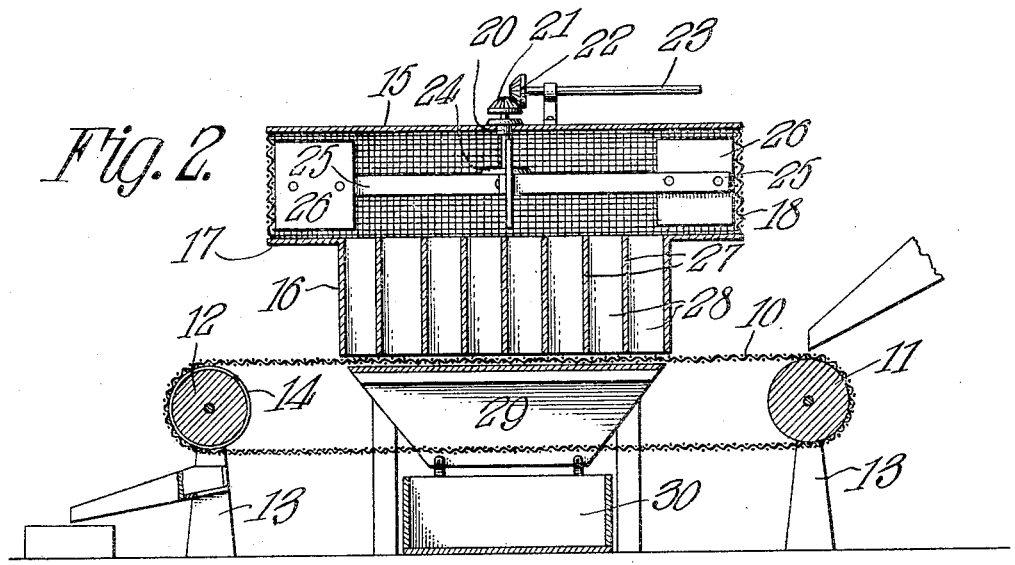

In the accompanying drawings, Figure 1 is a side elevation of a mill constructed in accordance with my invention, Fig. 2 is a vertical longitudinal sectional view therethrough, Fig. 3 is a vertical transverse sectional view on the line 3—3 of Fig. 1, and, Fig. 4 is a horizontal sectional view taken on the line 4—4 of Fig. 1, and partly broken away.

In the drawings, the mill is shown as comprising in part a foraminous conveyer apron 10 which travels over rollers, one indicated by the number 11 and the other by the numeral 12, these rollers being journaled at their ends in suitable bearings 13. For a purpose to be presently described, the roller 12 has a wire 14 wound spirally around it and secured thereto and this wire serves to space the foraminous conveyer apron 10 from the surface of the roller as will be readily understood. While I prefer to employ but a single wire for this purpose and to wind it spirally as stated, around the roller, it will be understood of course that some other means may be provided for spacing the conveyer apron from the surface of the roller. As is usual in mills of this class, a fan is mounted upon the conveyer apron and the construction and manner of mounting this fan will now be specifically described. The casing for the fan comprises an upper head 15 which is circular in form, and an air drum 16 which is cylindrical in form and is formed or provided at its upper edge with an outwardly extending flange 17 the periphery of which is coincident with the periphery of the upper head 15. A stout sheet of foraminous material is bent into annular form and is secured at its upper and lower edges to the edge of the head 15 and the outer edge of the flange 17 respectively and serves to space the two members of the fan casing. This foraminous connection between the two members of the fan casing is indicated by the numeral 18 and it will be understood that it may be in the nature of a sheet of wire mesh material or a sheet metal plate formed with perforations and formed through the connecting or vertical wall as it might be termed is a large opening 19 through which any light particles of straw and hulls may be blown after being drawn up into the casing by the suction force exerted by the fan. A shaft 20 is journaled in a bearing formed axially of the upper head 15 of the fan casing and this shaft has fixed at its upper end a beveled gear 21 with which meshes a similar gear 22 fixed upon a drive shaft 23. A head 24 is fixed upon the lower end of the shaft and from this head radiate arms 25 carrying fan blades 26 at their outer ends, the said fan blades being of a width substantially equal to the width of the flange 17 and traveling between the said flange and the corresponding portion of the upper head 15 of the casing. The lower end of the air drum 16 of the fan casing is located in a plane directly above the upper stretch of the foraminous conveyer apron 10 and it will be understood that as the fan is rotated, a suction will be exerted vertically through the said air drum 16 and it will further be understood that this suction force will act to raise the grain carried upon the conveyer apron beneath the said lower end of the air drum and that it will also act to draw up into the fan casing any hulls or light bits of straw.

I have found by actual experience that without the provision of some means within the air drum for breaking up the air currents, vortical currents will be formed and I therefore arrange within the said drum a plurality of intersecting vertically disposed plates 27, the arrangement of the plates forming vertical air passages 28 within the drum. I believe the provision of such plates to be the best method of forming such air passages within the drum but it will of course be understood that such passages may be formed in any other manner found desirable, the feature residing broadly in the formation of vertical air passages within the drum. It will of course be understood that in view of the fact that the air is drawn up through these air passages 28, there is no possibility of the formation of vortical air currents within the drum although such currents may form above the upper ends of the passages; this however does not affect the operation of the mill.

Disposed between the upper and lower surface of the foraminous conveyers apron 10 and between the rollers 11 and 12 is a pair of plates 29 which are inclined upwardly each in the direction of the other and are connected or secured together at their upper ends, the lower ends or edges of the plates being attached to a suitable support and being terminated preferably above a receptacle. The ridge formed by the connected upper edges of the two plates 29 extends in a line mid-way of the side edges of the conveyer apron.

The operation of the mill is as follows:— Grain to be separated is placed upon the conveyer apron 10 while the same is traveling and the fan is rotating, and this grain when brought to position beneath the lower end of the air drum 16, will be acted upon by the suction force created by the fan and the grains of the oats or the like will be drawn up or lifted so as to stand on their butt ends. The grains of cultivated wheat or oats, being smooth, will only assume this position while passing beneath the air drum, but the wild oats being rough, its grains will be caught in the meshes of the conveyer apron and held thereby. These grains of wild oats will not be forced or dislodged from the apron as it passes over the roller 12 owing to the fact that it is held in spaced relation with respect to the surface of the roller, but the grains of cultivated oats being smooth, will drop from the apron as it passes over the said roller. The grains of wild oats will be carried by the apron to the roller 11 and as the apron travels directly against the surface of this roller, the said grains will be forced or dislodged from the apron and be permitted to drop therefrom. It will thus be seen that the cultivated grain is discharged at one end of the conveyer and the wild grain at the other end. Small grain such as timothy, flax, etc., will drop through the upper stretch of the conveyer apron and falling upon the plates 29, will roll down the plates and into the receptacle provided beneath the lower edges thereof, this receptacle being indicated by the numeral 30. Hulls from the grain or light bits of straw will be drawn up by the suction force produced by the fan, through the air passages 28, and into the fan casing and they will then be blown out by the fan through the opening 19 in the vertical wall of the casing. In the cleaning of barley and larger grain, a coarser foraminous conveyer is used to obtain better results and in the use of such a conveyer, the wild oats will drop through the upper stretch thereof and will fall upon the plate 29 and roll down the plate into the receptacle beneath. In the employment of a conveyer having a medium size of mesh, that class of grain known as "king crown or king head seed" being lighter than wheat will be drawn up by the suction fan into the fan casing together with the hulls, light bits of straw, etc.

What is claimed, is:—

1. In a grain separator, a foraminous apron, a casing over and in proximity to the apron, said casing being subdivided into a plurality of vertical passages, means for feeding grain to said apron and passing the same under said casing, means connected to said casing for maintaining through said apron and said passages air currents of force sufficient to "up end" the grains, and means for separately discharging the different grades.

2. In a grain separator, a foraminous apron, a casing over and in proximity to the apron, said casing being subdivided into a plurality of vertical passages, a chute for feeding grain to said apron and passing the same under said casing, a fan connected to said casing for maintaining through said apron and said passages air currents of force sufficient to "up end" the grains, and means for separately discharging the different grades.

3. In a grain separator, a foraminous apron, a casing over and in proximity to the apron, said casing being subdivided into a plurality of vertical passages, a chute for feeding grain to said apron and passing the same under said casing, a fan connected to said casing for maintaining through said apron and said passages air currents of force sufficient to "up end" the grains, a roller supporting said apron and having means thereon to hold the apron in spaced relation thereto, and a second roller supporting said apron in spaced relation to the first roller.

In testimony whereof, I affix my signature, in presence of two witnesses.

LOUIS O. HAGE.

Witnesses:
E. BOURBONNIERE,
G. O. HAGE.